June 16, 1925.

M. VICTORSOHN

MOTOR RESETTER

Filed April 17, 1922   3 Sheets-Sheet 1

1,541,876

Inventor:
Morris Victorsohn
By Frederick V. Winters
Attorney.

June 16, 1925.

M. VICTORSOHN

MOTOR RESETTER

Filed April 17, 1922    3 Sheets-Sheet 2

1,541,876

Inventor.
Morris Victorsohn
By Frederick V. Winters,
Attorney.

June 16, 1925.

M. VICTORSOHN

MOTOR RESETTER

Filed April 17, 1922

Inventor.
Morris Victorsohn,
By Frederick V. Winters,
Attorney.

Patented June 16, 1925.

1,541,876

UNITED STATES PATENT OFFICE.

MORRIS VICTORSOHN, OF BROOKLYN, NEW YORK.

MOTOR RESETTER.

Application filed April 17, 1922. Serial No. 554,278.

*To all whom it may concern:*

Be it known that I, MORRIS VICTORSOHN, a citizen of the United States, residing at Brooklyn, in the county of Kings and State of New York, have invented certain new and useful Improvements in Motor Resetters, of which the following is a full, clear, and exact specification.

This invention relates to motors for driving various kinds of mechanism but especially designed and adapted for rotating the turntables of phonographs or talking machines.

The motor herein disclosed is quite similar in construction and operation to the one shown and described in my prior application filed October 20, 1919, Ser. No. 331,769. The present invention relates particularly to the means for resetting the motor, and the object of this invention is to provide means for conveniently resetting the motor by hand from the top of the instrument or cabinet. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
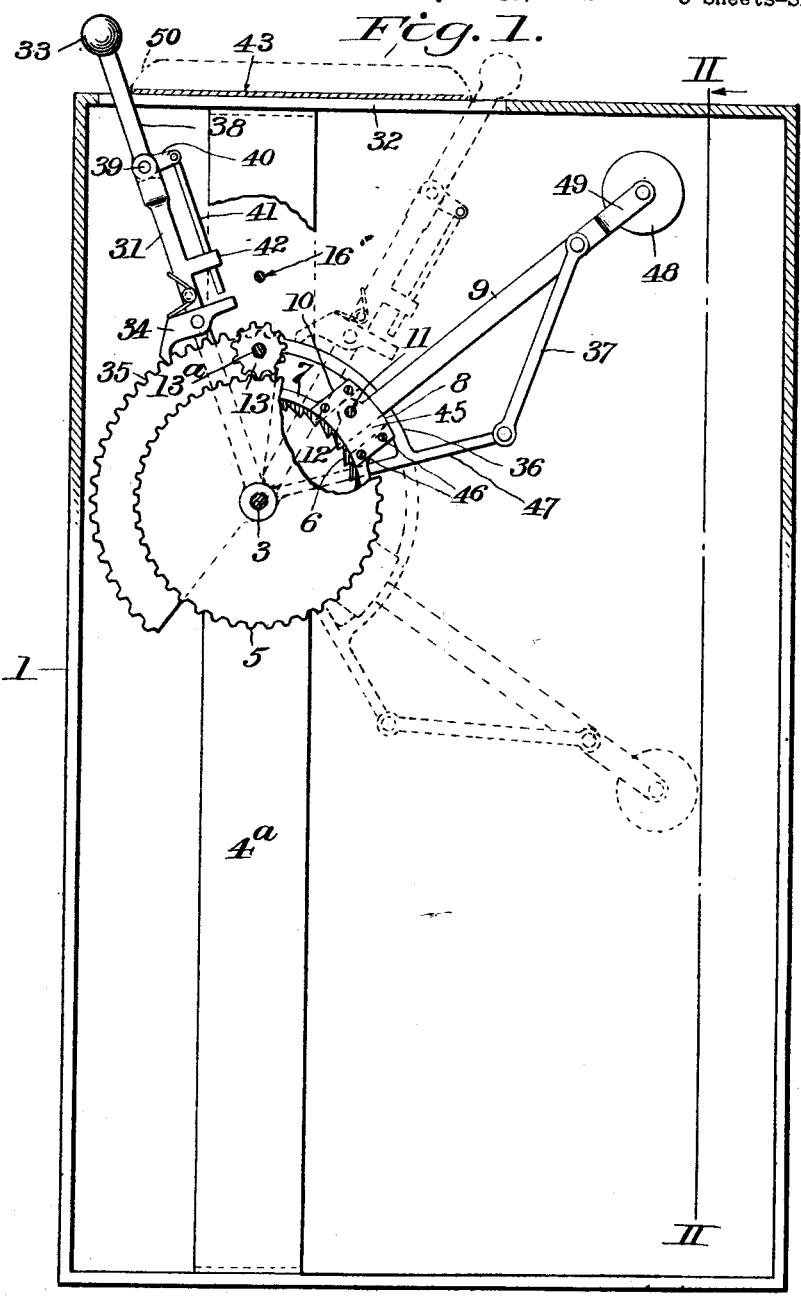
Figure 1 is a section through the casing or cabinet showing the motor in side elevation and in set position, the positions of the weighted arm and resetting lever being also indicated in dotted lines in the positions they occupy when the motor has run down, the section being on line I—I of Figure 2.
Figure 6:
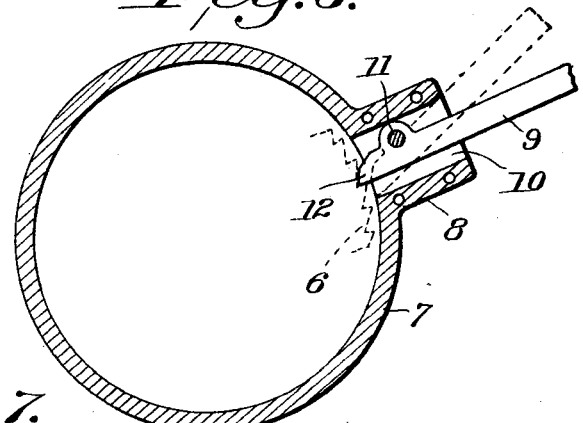
Figure 6 is a broken detailed side view of the carrier for the weighted arm of the motor, showing the ratchet connection between said arm and main gear.

In the drawings 1 indicates a casing or cabinet of a phonograph in which a compartment 2 may be reserved for storing records or other purposes. The main horizontal bearing shaft 3 of the motor is journaled in one wall of the cabinet and in spaced upright supporting members 4 and 4ª. The main gear 5 is mounted on said shaft 3 and has a concentric ratchet portion 6 at one side over which the annular flange 7 of the carrier 8 for the weighted lever 9 extends; said carrier being in disk form and also loosely mounted on the shaft 3. Said carrier has a radially offset chambered portion 10 in which the lever 9 carrying a weight 48 in its forked end 49 is pivoted at 11, and the inner end of said lever has a ratchet tooth 12 to engage the ratchet portion 6 on the main gear 5, as shown in Figures 1 and 6. When the weighted lever moves downward in operation from the position shown in solid lines in Figure 1 to that illustrated in dotted lines, the ratchet tooth 12 is held in engagement with the ratchet portion 6 and causes the main gear 5 to turn, but when said weighted lever is being raised in resetting the motor, as will be hereinafter explained, the ratchet tooth 12 is disengaged from said ratchet portion 6 of the main gear, as indicated in dotted lines in Figure 6.

Figure 2:
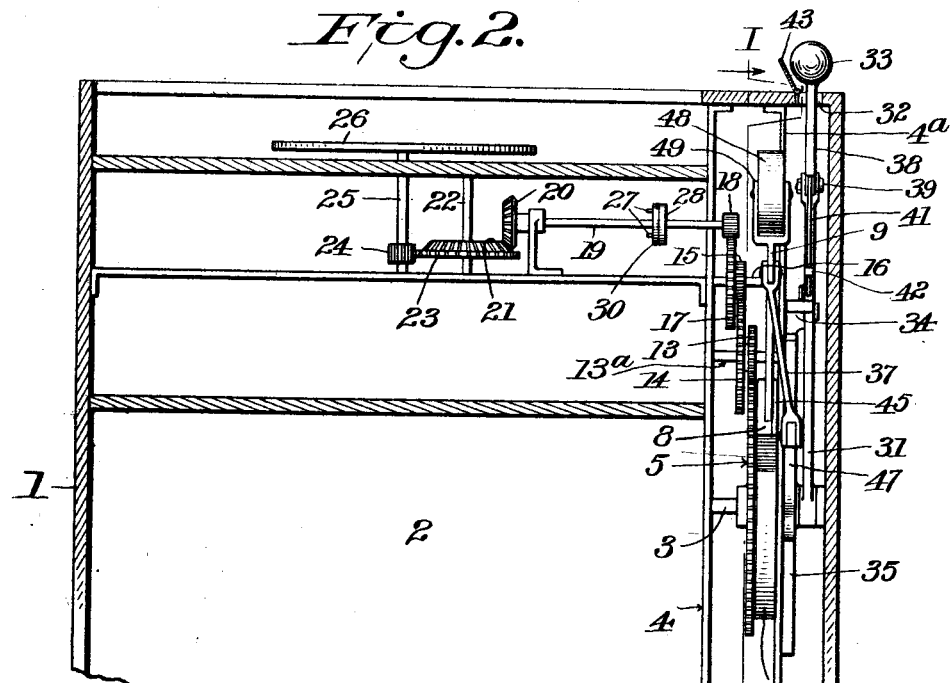
Figure 2 is a section of the apparatus on the line II—II of Figure 1.

As shown in Figure 2, the main gear 5 meshes with a gear 13 on a counter shaft 13ª extending between the supports 4 and 4ª and turning with another gear 14 which meshes with a gear 15 on another counter shaft 16. Said gear 15 turns with another gear 17 which meshes with a gear 18 on the horizontal shaft 19 carrying a bevel pinion 20 in mesh with another bevel gear 21 on a vertical shaft 22. The bevel gear 21 turns with a gear 23 which meshes with a gear 24 on the shaft 25 carrying the turntable 26. It will thus be seen that the rotation of the main gear by the downward movement of the weighted arm will be transmitted through the multiplying gear train just described to the turntable which will be given a considerable number of revolutions during the said downward movement of the arm because of the relative sizes of the gears in said train as illustrated in Figure 2.

Figure 7:
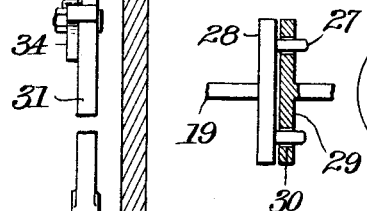
Figures 7 and 8 are detailed views of the loose coupling between sections of the horizontal shaft running from the motor to the turntable shaft.
Figure 8:
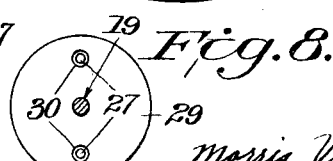

In order to provide a loose coupling in the gear train and prevent injury to any of the gears during operation or resetting of the motor, the horizontal shaft 19 is made in two sections, one of which carries a disk 28 having projecting pins 27, Figures 7 and 8, while the other carries a disk 29 having holes 30 therethrough larger than said pins and into which said pins extend. This construction allows one section of said shaft 19 to slip or turn independently of the other to a limited extent.

The resetting of the motor is effected by a lever 31 which is pivotally mounted on the shaft 3, see Figures 1 and 2, and has its upper end projecting through a slot 32 in the top of the cabinet 1 and fitted with a suitable knob or handle 33. Said lever carries a spring pressed pawl 34 which normally engages a segmental rack or gear 35 mounted to turn freely on the main shaft 3. This segmental gear has a plain portion 36 provided with a radially extending arm 47 arranged below the weighted arm or lever 9 and connected thereto by a link 37. Because of the connections between the parts just described it will be noted that as the weighted lever arm 9 moves downward the resetting lever 31 swings from left to right as shown in Figure 1, and that when said resetting lever is swung from right to left the weighted lever arm will be raised.

Figure 9:
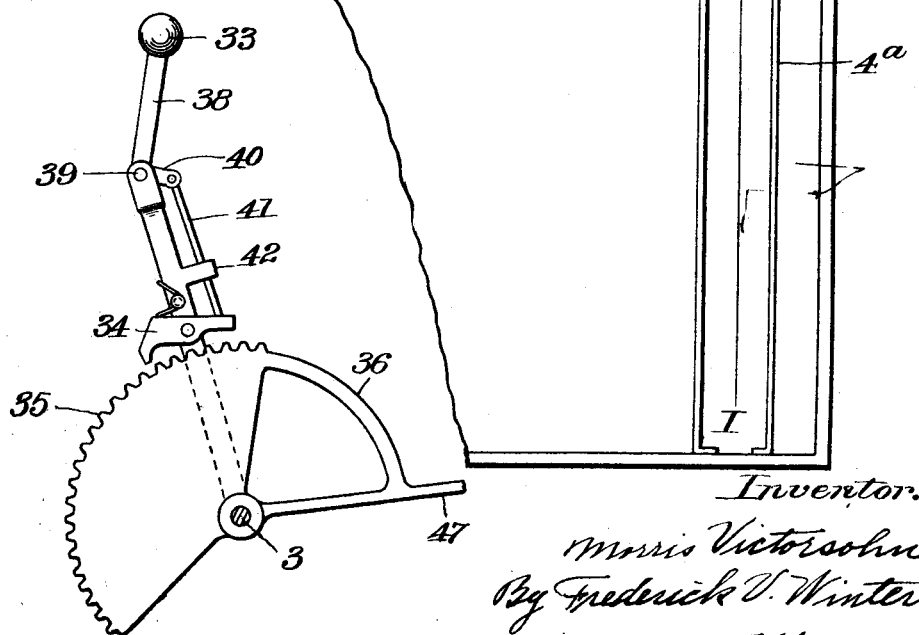
Figure 9 is a detailed view of the resetting lever, showing how the pawl is automatically raised out of engagement with the segmental gear when said lever is swung in a reverse direction.
Figure 5:
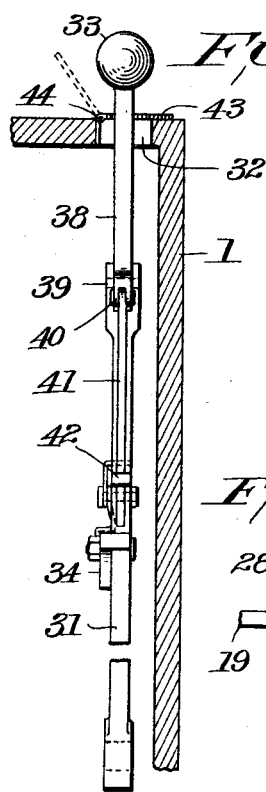
Figure 5 is detailed elevation of the resetting lever on a larger scale than Figure 2, said lever being shown with relation to the slot in the top of the cabinet.

The upper end portion 38 of the lever 31 is swiveled to the main portion thereof, as at 39, Figures 1, 5 and 9, and said upper end portion 38 carries a rock arm 40 connected to a push rod 41 guided in a bracket 42 on the main portion of the lever and extending to a point just above the free end of the pawl 34. Said pawl may thus be released from the segmental gear 35 by swinging said upper end portion 38 of the lever 31 to the right, as indicated in Figure 9.

Figure 3:
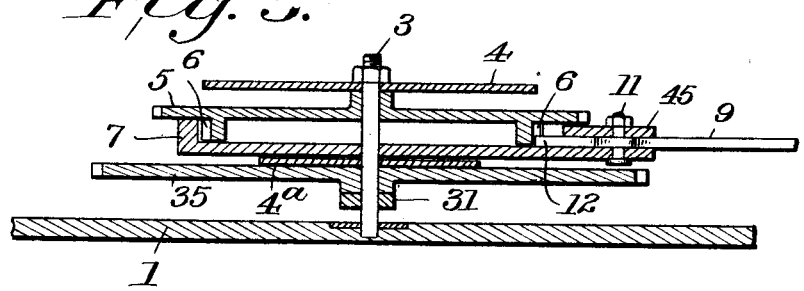
Figure 3 is a section through the main gears of the motor showing the way in which the weighted arm is mounted.
Figure 4:
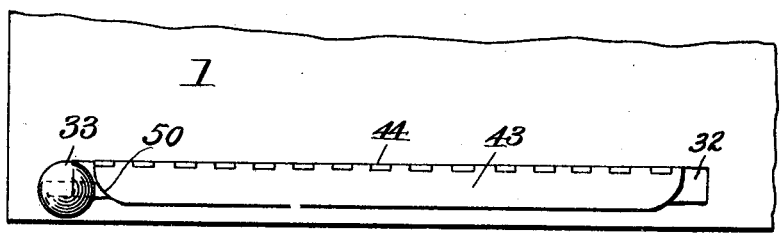
Figure 4 is a plan view of a portion of the top of the casing or cabinet showing the slot through which the resetting lever works closed by the hinged cover therefor.

The slot 32 in the top of the cabinet may be closed when the instrument is not in use by a cover plate 43 hinged at 44, Figures 1, 4 and 5. As illustrated in Figures 1 and 3, the radially offset chambered portion 10 of the carrier 8 for the weighted lever arm is provided with a cover 45 secured in place by screws 46 and serving as one of the supporting bearings for the pivot pin 11 for said lever arm.

The cover plate 43 for the slot 32 heretofore mentioned preferably has its free corners rounded, as at 50, Figures 1 and 4, so that it will be raised automatically by the lever 38 when the latter is moved from one end of the slot to the other. As soon as said lever has reached one end of the slot, the cover plate will drop again into closed position. When the lever has been operated to reset the motor, said lever may be immediately returned to the other end of the slot, if desired, where it is ready for the next resetting operation.

I claim:

1. The combination with a member to be rotated, of a ratchet carried thereby, an arm carrying a pawl to engage said ratchet, a weight on the arm for actuating said member, a resetting lever pivoted concentrically to said member, and means of connection between said lever and arm for raising the latter.

2. The combination with a member to be rotated, of an arm having intermittent gripping connection therewith, a weight on said arm for actuating said arm and member, a resetting lever, a segmental gear operatively connected to said arm, and intermittent gripping connection between said lever and segmental gear for raising said arm.

3. The combination with a member to be rotated, of an arm having intermittent gripping connection therewith, a weight on said arm for actuating said arm and member, a resetting lever, and a segmental member connected to said lever and arm for raising the latter.

4. The combination with a member to be rotated, of an arm having intermittent gripping connection therewith, a weight on said arm for actuating said arm and member, a resetting lever pivoted concentrically of said member, and a segmental disk also pivoted concentrically of said member and having intermittent connection with said lever for raising said arm.

5. The combination with a member to be rotated, of an arm having intermittent connection therewith, a weight on said arm for actuating said member, a segment pivoted concentrically of said member, a link connecting said segment and arm, and a resetting lever having intermittent connection with said segment for raising said arm.

6. The combination with a member to be rotated, of an arm having intermittent connection therewith, a weight on said arm for actuating said member, a segmental rack connected to said arm, and a resetting lever carrying a pawl to engage said rack for raising said arm.

7. The combination with a member to be rotated, of an arm having intermittent connection therewith, a weight on said arm for actuating said member, a segmental rack connected to said arm, a resetting lever carrying a pawl to engage said rack for raising said arm, and means on the lever for releasing said pawl from said rack when said lever is moved in reverse direction.

8. The combination with a curved rack, of a lever, a pawl pivoted on said lever and adapted to normally engage said rack, a handle at the free end portion of said lever rule jointed thereto and having a projecting lug, a push-rod connected to said lug and adapted to engage said pawl beyond its pivot for releasing the same from the rack when the lever is moved in a reverse direction, and a guide lug on said lever through which the push rod loosely extends.

9. The combination with a member to be rotated, of a carrier mounted to turn concentrically of said member and having a flange surrounding the same, and a weighted lever pivoted on said flange and having means for intermittently gripping said member.

10. The combination with a member to be rotated, of a carrier mounted to turn concentrically of said member and having a flange surrounding the same, there being a chambered projection on said carrier in line with said flange, and a weighted lever pivotally mounted in said chambered projection and having means for intermittently gripping said member.

11. The combination with a member to be rotated, said member having a ratchet portion, of a carrier mounted to turn concentrically of said member and having a flange overlapping said ratchet portion, a weighted lever pivotally mounted on said flange, and a tooth on said lever to engage said ratchet portion.

12. The combination with a member to be rotated, of a carrier mounted to turn concentrically of said member and having a flange overlapping said member, there being a recessed projection on said carrier in line with said flange and opening on one face of the carrier, a removable cover for said recessed projection, and a weighted lever pivotally mounted between said recessed projection and cover and having means for intermittently gripping said member.

13. The combination with a motor of the character described, of a cabinet therefor, said cabinet having a slot therein, a motor resetting lever extending through said slot, and a cover for covering the main portion of the slot when the lever is at either end thereof.

In testimony whereof I have signed my name to this specification.

MORRIS VICTORSOHN.